Sept. 8, 1959 H. FINE 2,903,505

COLOR TELEVISION SYSTEMS

Original Filed Aug. 21, 1951 4 Sheets-Sheet 1

INVENTOR
HARRY FINE
BY H. L. Godfrey
ATTORNEY

INVENTOR
HARRY FINE
BY H. L. Godfrey
ATTORNEY

INVENTOR
HARRY FINE
BY H. L. Godfrey
ATTORNEY

Sept. 8, 1959 H. FINE 2,903,505

COLOR TELEVISION SYSTEMS

Original Filed Aug. 21, 1951 4 Sheets-Sheet 4

INVENTOR
HARRY FINE
BY H. L. Godfrey
ATTORNEY

United States Patent Office 2,903,505

Patented Sept. 8, 1959

2,903,505

COLOR TELEVISION SYSTEMS

Harry Fine, Washington, D.C.

Original application August 21, 1951, Serial No. 242,973. Divided and this application January 30, 1957, Serial No. 637,851

9 Claims. (Cl. 178—5.2)

(Granted under Title 35, U.S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to color television systems and more specifically to systems in which the image is scanned in a different color of the color cycle during each of a corresponding cycle of successive segments of a scanning line.

Color may be provided in television systems by scanning the image in the primary colors and transmitting in sequence this color information by switching the primary colors at a rate corresponding to the field, line, or dot frequency. Thus a system in which information on only one primary color is transmitted during any scanning field, but in which successive fields supply information sequentially in the primary colors is known as a field sequential system. Similarly, those systems for which information in only one color is supplied in any scanning line or dot, but in which successive lines or dots respectively supply information sequentially in the primary colors are called line sequential and dot sequential color television systems respectively.

Each of the above described systems have their respective advantages and disadvantages. Thus, the field sequential system is the simplest to operate, but is the one most susceptible to picture flicker and requires a more rapid field frequency with consequent reduction in the transmitted picture definition over a given band width of frequencies. For this reason, this type of color system is not compatible with the existing monochrome television standards, the field rate for which is too slow to avoid a serious flicker in the field sequential color television pictures.

The line sequential system is not subject to the flicker of the field sequential system, but is subject to a color crawl in saturated color areas. Under these conditions, every third line scan would be in the desired color and, with standard line interlace, each color would be repeated only every sixth line. With so coarse a grid structure, the color line appears to crawl and the effect is objectionable. In addition, a severe registration problem is involved, that is, the various colors must be properly superimposed for faithful color reproduction.

A dot sequential system is possible which uses the principle of mixed-highs, whereby color information is transmitted only for the lower frequencies which are then time-multiplexed to increase the color switching rate. The high frequencies are transmitted in monochrome and supply the fine grain definition. The system makes efficient use of the frequency spectrum, but for practical purposes the switching or sampling frequency is too high for passage through existing telephone cables without frequency compression. The registration problem is extremely severe because of the small elements of area involved. This system cannot use to advantage a second dot interlace to improve the definition of the picture, so that if dot interlace becomes standard monochrome practice to increase picture resolution, this system will not be able to take advantage of the increased definition. Finally, it is difficult to provide a color switching device able to switch as rapidly as required by this system.

In the present invention, the image is scanned in the primary colors and the color information is transmitted sequentially at a rate intermediate between that for the dot and line systems. In other words, this system will be a segment-of-line sequential color system. During any basic time interval or segment, information on only one color is transmitted. It differs fundamentally from a dot sequential system in that during a color interval, the transmitted signal in this invention may have variable modulation, whereas by definition the dot, or picture element, is so small an interval that the transmitted signal can have no variable modulation during that interval. The color information may consist of all or only part of the frequency spectrum and all or only a fraction of total signal energy in the transmitted color frequencies depending upon the details of the particular system. The color switching rate may be stabilized both in frequency and phase by synchronizing pulses after each line scan.

It is an object of this invention to provide a color television system in which one color is used to scan a segment-of-a-line.

It is a further object of this invention to provide a color television system in which the television signal will pass through the existing transmission cables having a band width of 2.8 megacycles.

It is a further object of this invention to provide a color television system compatible with the present sixty field per second interlace system now used for monochrome television.

It is an object of this invention to provide a color television system in which there is a minimum of objectionable color crawl in areas of saturated color.

It is an object of this invention to provide a color television system in which the color switching rate is sufficiently low so that it will be relatively easy to provide a color switching means to give adequate registration of color elements.

It is an object of this invention to provide a color television system in which there is a high ratio of color to gray areas, giving a more brilliant color rendition.

It is an object of this invention to provide a color television system in which the definition is substantially equal to that for standard monochrome television transmission.

It is an object of this invention to provide a color television system in which a dot interlace may be used to obtain greater horizontal definition if desired.

Other objects and advantages of this invention will become apparent to those skilled in the art from consideration of the following specification when taken in connection with the accompanying drawings in which.

Figure 1:
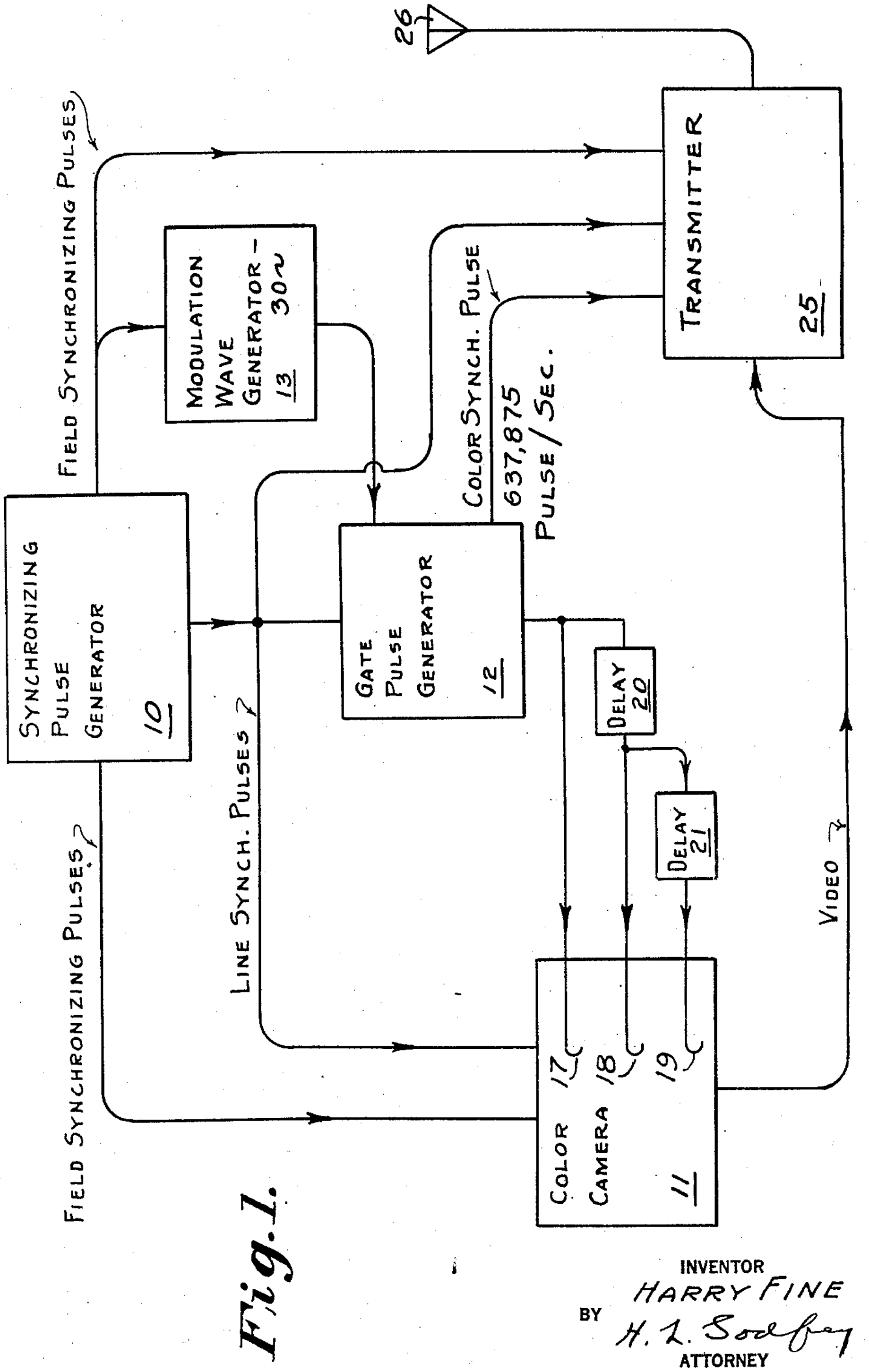
Figure 1 is a block diagram of a television transmitter embodying the principles of this invention.

In the color television transmitter shown in Figure 1, there is provided a synchronizing pulse generator 10 which generates line and field synchronizing pulses and applies them to the color camera 11, where these synchronizing pulses control the generation of horizontal and vertical sweep waves and the scanning of the image being viewed by the camera.

The synchronizing pulse generator 10 supplies line synchronizing signals to the gate pulse generator 12. The gate synchronizing pulse generator 12 produces pulses at a rate equal to that at which a single color is scanned. It is a feature of this invention that this rate is greater than the dot or element rate, but less than the line scanning rate.

The field synchronizing pulses generated by synchronizing generator 10 are also applied to modulation wave generator 13. This generator 13 may be a frequency divider which, from the 60 cycle field synchronizing pulses, produces a 30 cycle modulating wave which is applied to modulate the gate pulse generator 12. The gate pulse generator 12 is modulated in such a fashion by the 30 cycle modulating wave applied thereto that it undergoes a phase shift during every second vertical blanking period and advances the gate pulses by one color interval every other field. The construction of components 12 and 13 could take many forms, known to those skilled in the art, to accomplish their intended purpose. It is preferable, however, to provide component 13 in the form of a scale-of-three counter and to provide component 12 in the form of a pulse-position-modulation circuit. Gate pulse generator 12 produces square gating pulses having a width equal to one color interval and spaced apart by an interval equal to two color intervals. A color interval is the duration of time that one color is continuously scanned during one segment-of-a-line. Gate pulse generator 12 also provides color synchronizing pulses at the frequency of the gate pulses.

Camera 11 may consist of three conventional television pick-up tubes mounted contiguously and arranged so that the same image is thrown on each of the three sensitive screens. The image projected on the first sensitive screen might be passed through a filter transmitting a first primary color, such as red. The images cast on the second and third sensitive screens might be passed through filters transmitting respectively second and third primary colors, such as green and blue. The electron guns of these three tubes in color camera 11 include respectively cathodes 17, 18 and 19, are ordinarily biased to cut-off, and only operate upon the application to their respective cathodes of a gate pulse from generator 12. Gate pulses from generator 12 are applied directly to cathode 17 of camera 11, but are delayed in circuit 20 before application to cathode 18. The delayed pulses from circuit 20 are additionally delayed in circuit 21 before application to cathode 19. Delay circuits 20 and 21 each delay the pulses applied thereto by a period equal to one color interval.

In the operation of Figure 1, as the image is scanned, the color camera produces a signal indicative of first one primary color, then a second primary color and then a third primary color. The colors are selected in sequence and at a rate determined by color control pulses received from the gate pulse generator 12. A gating pulse arriving at the color camera 11 will initially energize the first gun through cathode 17. When the first gun becomes inactive, the pulse will emerge from delay circuit 20 and start to energize cathode 18 of gun 2. When the delayed pulse from delay circuit 20 terminates, the doubly delayed pulse from circuit 21 will start to energize the third gun through cathode 19. Upon termination of the doubly delayed pulse, the next pulse will be applied to the first gun through cathode 17 and the cycle will be repeated.

The signals produced by color camera 11 are applied to transmitter 25 where they are modulated on a radio frequency carrier and radiated from antenna 26.

Alternatively, the color camera 11 could include a single tricolor pick-up tube having three guns, each scanning photo-sensitive elements giving signals indicative of intensity of one color. The color camera 11 could be any device producing signals of a first primary color during a first segment-of-a-line, of a second primary color during a second segment-of-the-line, of a third primary color during a third segment-of-a-line, and then continuously repeating the cycle.

Figures 2, 3, 4:
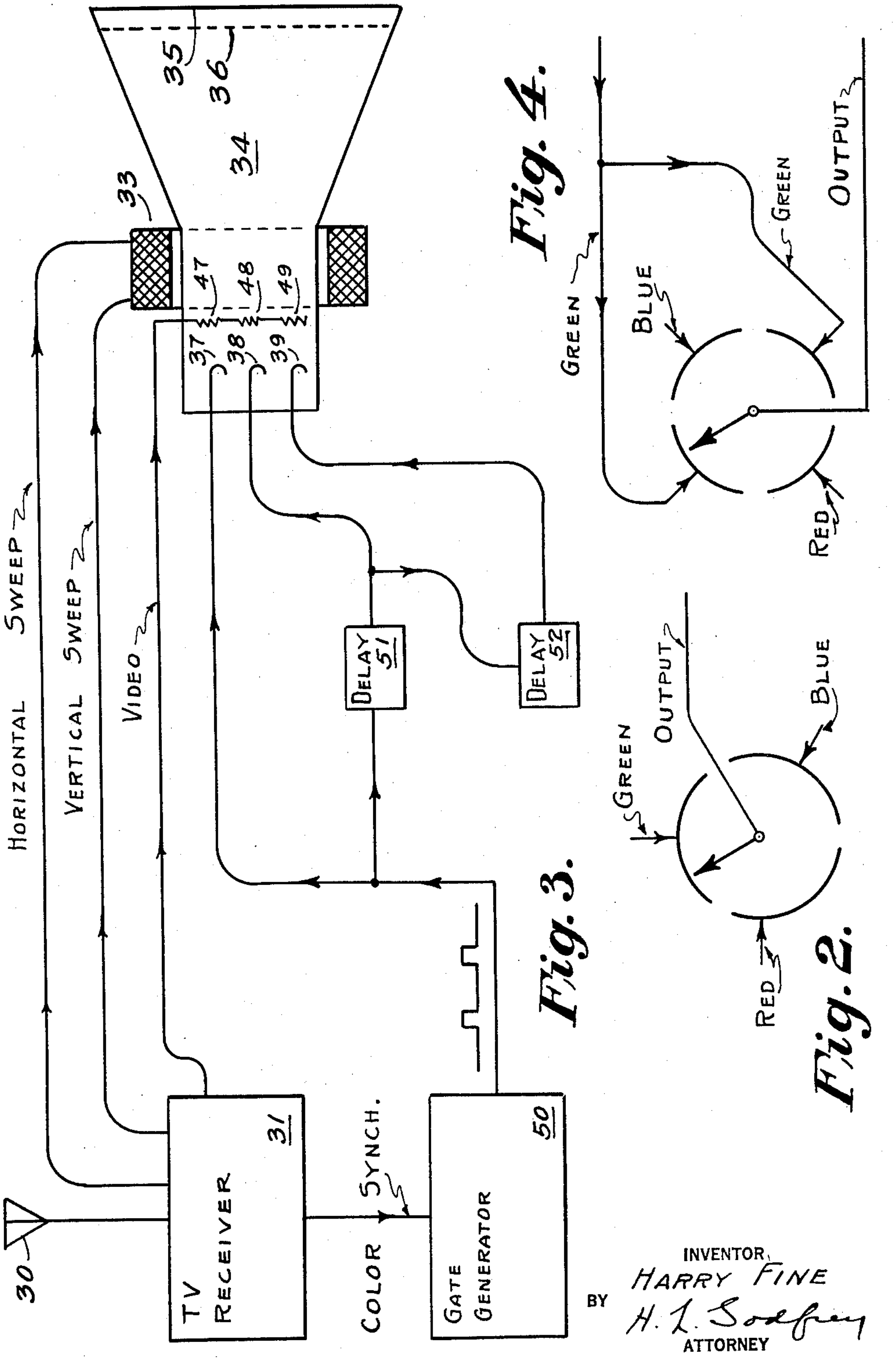
Figure 2 is a schematic diagram explaining the color switching operation employed in the transmitter of Figure 1.
Figure 3 is a block diagram of a television receiver embodying the principles of this invention.
Figure 4 is a schematic diagram explaining an alternate color switching operation which may be used in the transmitter of Figure 1.

The operation of the color camera is shown schematically in Figure 2, where it is represented as a rotating switch or commutator.

The line and frame synchronizing pulses from synchronizing generator 10 are also applied to transistor 25, where, in the conventional manner, the line synchronizing signals are placed between each pair of lines and field synchronizing signals are placed between each pair of fields.

The color synchronizing signals from gate pulse generator 12 are also applied to transmitter 25. A burst of color synchronizing frequency, in phase with the gate pulses supplied to camera 11, is added to the transmitted signal between each pair of lines to synchronize the color switching operation at the receiver. Alternatively, the color synchronizing signals could consist of short bursts of a frequency which bears a selected relation to the frequency of the gate pulses.

Figure 3 shows a color television receiver arranged to receive the color television signal broadcast by the transmitter shown in Figure 1, and to reproduce therefrom in color the image being scanned at that transmitter. The radio frequency carrier from the transmitter of Figure 1 is received on antenna 30 in Figure 3 and is applied to television receiver 31 which generally is a conventional television receiver as is used for receiving monochrome television signals.

In television receiver 31, the line and field synchronizing signals are separated from the video signals and used to produce vertical and horizontal sweep waves which are applied to the deflecting yoke 33 of the color television reproducing tube 34.

Television reproducing tube 34 has three guns respectively including cathodes 37, 38 and 39 and grids 47, 48 and 49. The fluorescent screen 35 of tube 34 comprises groups of small dots of phosphors. Each group contains a phosphor that emits light in a first primary color, such as red, a phosphor that emits light in a second primary color, such as green, and a phosphor that emits light in a third primary color, such as blue. There is approximately one group of phosphor dots for each dot or element of the picture being scanned. A perforated metal mask 36 is interposed between the fluorescent screen 35 and the electron guns. The holes in the mask 36 are of such a size and in such positions that electrons from the gun containing cathode 37 can strike only the red-emitting dots. Electrons from the gun containing cathode 38 can strike only the green-emitting dots, and electrons from the gun containing cathode 39 can strike only the blue-emitting dots.

The video signal from the television receiver 31 is applied to all three control grids 47, 48 and 49 of the cathode ray tube 34.

The color synchronizing bursts in the wave transmitted from the transmitter of Figure 1 are separated out in the television receiver 31 of Figure 3 and are applied to the color gate generator 50. Color gate generator 50 is a continuously running oscillator which produces square gating pulses having a width equal to one color interval and which are separated by a distance equal to two color intervals. The color gate pulses are applied from color gate generator 50 directly to the cathode 35 of the first gun in tube 34. The color gate pulses are applied to cathode 36 of the second gun of tube 34 through delay circuit 51 which interposes a delay equal to one color interval. The delayed pulses from delay circuit 51 are passed through a second delay circuit 52 and are finally applied to cathode 37 of the third gun of television reproduction tube 34. The three guns of tube 34 are normally biased to cut off and operate only upon the application to their respective cathodes of a color gate pulse. These color gate pulses are applied to the three cathodes in such a manner that the cathodes are activated cyclically in turn, each for one color interval, as in the case of the three guns in color camera 11.

In the operation of the television color system shown in Figures 1 and 3, the optical system of color camera 11 will project on the sensitive screens of the three pick-up devices in camera 11 images respectively indicative of intensities of the image in the three chosen primary colors, which may be red, green and blue. When the signal broadcast by the transmitter of Figure 1 is received by the receiver 31 of Figure 3, the horizontal and vertical synchronizing pulses control horizontal and vertical sweep generators producing horizontal and vertical sweep waves which, when applied to deflecting yoke 33 of tube 34, cause the electron beam of whichever of the three guns that is activated at the instant to scan in vertically displaced horizontal lines the screen 35 of the tube 34 in synchronism with the scanning at camera 11. During a red scanning interval, the video signal is indicative of the intensity of the color red in the elements of the line segment being scanned; a gate pulse is applied from color gate generator 50 to the cathode 37 energizing the electron gun which is able to scan through the holes of the mask 36 and strike only the red-emitting phosphor dots of screen 35. During the next color interval, the video signal represents the green color content of the elements of the line segment being scanned, and the gate pulse which just activated the red gun is now applied to cathode 38 through the delay circuit 51 to activate the green gun, which can strike only the green-emitting phosphors of screen 35. During the next color interval, the video signal represents the blue content of the picture elements being scanned and at this time the blue gun is activated through the application to cathode 39 of the color gate pulse through delay circuits 51 and 52. Cathodes 37, 38 and 39 of the tube 34 are pulsed in synchronization with the pulsing of the cathodes 17, 18 and 19 of the color camera 11 because of the synchronization of the color gate generator 50 with gate generator 14 by means of the short burst of color synchronizing pulses contained between each pair of lines. The video signal applied to grids 47, 48 and 49 of tube 34 modulates the intensity of the color produced on screen 35 in accordance with the simultaneously produced signal from camera 11.

This invention contemplates that a color interval be a segment of a line, that is, the color interval should be larger than a dot, or larger than a span of time so small that the transmitted signal can have no variable modulation during that span. The color interval likewise would be less than a line. As an example, the gate generator 12 might produce 637,875 pulses per second, which means that one color would appear in the picture at that rate which is 40.5 times the horizontal line rate. One primary color would appear 40.5 times in one horizontal line. The color switching rate will be 1,913,625 color segments per second. It will be noted that the ratio of the gate pulse frequency to the line frequency may be factored into several small integers. This ratio, 486, equals $2\times3\times3\times3\times3\times3$ so that the color switching frequency may be easily controlled by the same frequency standard as the line, the 30 cycle modulator and field frequencies, through frequency multipliers.

The color pattern of the initial parts of the first six lines for the first six fields of the scanning system described above is shown below:

| Field | Pattern | Lines |
|---|---|---|
| | r g b r g b r g b r g b | 1 |
| ↗ | b r g b r g b r g b r g | 2 |
| First field → | b r g b r g b r g b r g ↖ | 3 |
| ↘ | r g b r g b r g b r g b ← Second field | 4 |
| | r g b r g b r g b r g b ↙ | 5 |
| | b r g b r g b r g b r g | 6 |

| Field | Pattern | Lines |
|---|---|---|
| | g b r g b r g b r g b r | 1 |
| ↗ | r g b r g b r g b r g b | 2 |
| Third field → | r g b r g b r g b r g b ↖ | 3 |
| ↘ | g b r g b r g b r g b r ← Fourth field | 4 |
| | g b r g b r g b r g b r ↙ | 5 |
| | r g b r g b r g b r g b | 6 |

| Field | Pattern | Lines |
|---|---|---|
| | b r g b r g b r g b r g | 1 |
| ↗ | g b r g b r g b r g b r | 2 |
| Fifth field → | g b r g b r g b r g b r ↖ | 3 |
| ↘ | b r g b r g b r g b r g ← Sixth field | 4 |
| | b r g b r g b r g b r g ↙ | 5 |
| | g b r g b r g b r g b r | 6 |

Each time interval or segment of color is represented by a letter denoting the color during that interval. Thus, red, green and blue are represented by r, g and b, respectively. Each color is repeated 40.5 times in a complete line and the frame rate is ten complete color pictures per second. It should be noted that the space between successive color intervals is equal in magnitude to a small fraction of the color segment. However, a slight overlap of color intervals is permissible or perhaps even desirable. A variation of the above described system might be to transmit a part of the frequency spectrum as monochrome information with the color information in the remainder of the spectrum superimposed upon it. Such procedure would increase the resolution in the primary color saturated areas.

For some purposes, it may be desirable to increase the effective frame rate of the system. This may be accomplished in several ways. Probably the simplest is to take advantage of the greater sensitivity of the human eye to green by using a four color sequence in which green is repeated twice as often as the other colors. Thus, the color sequence might be green, red, green, blue as obtained by the switching arrangement represented schematically in Figure 4.

Figure 5:
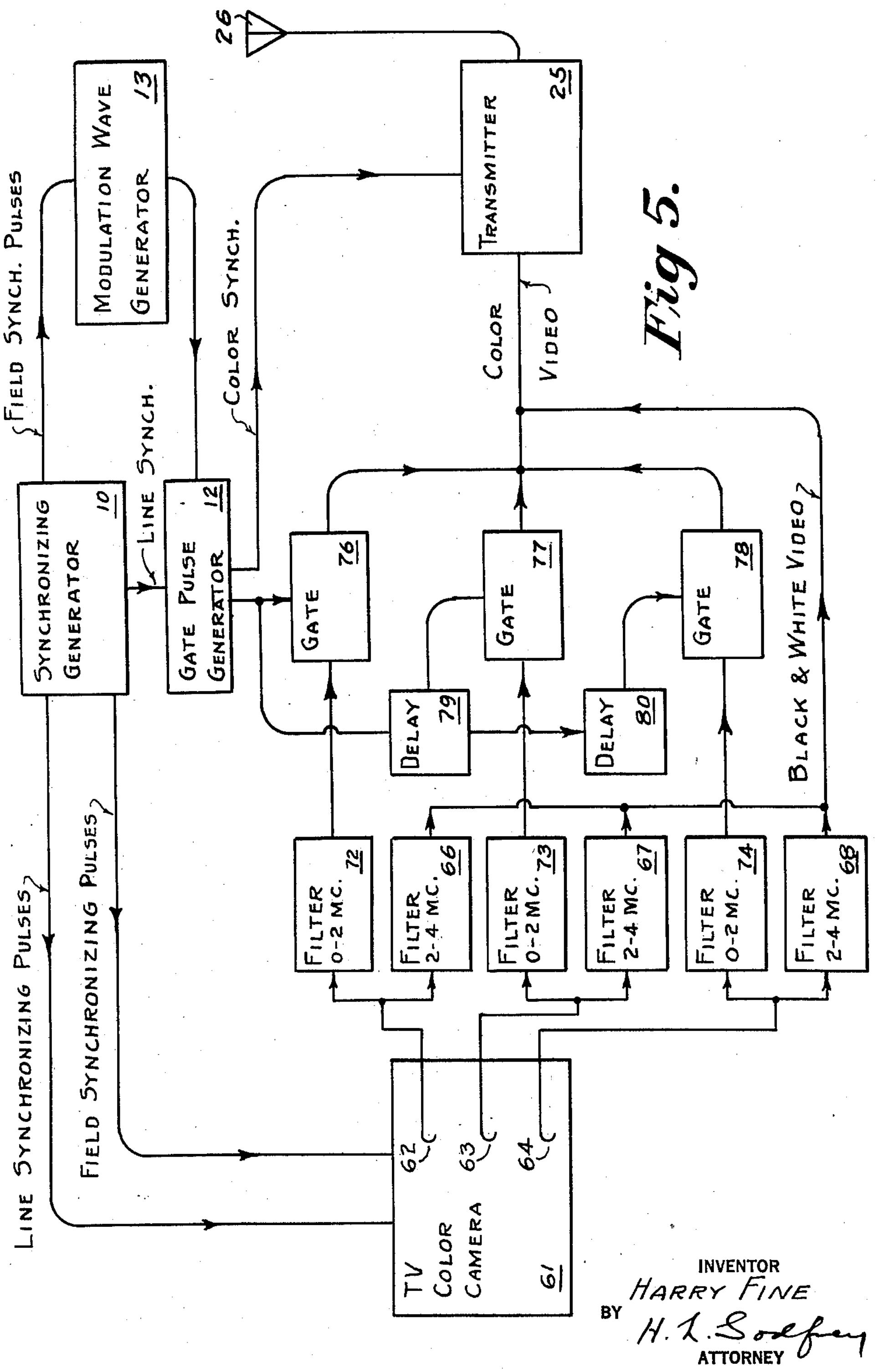
Figure 5 is a schematic diagram showing a television transmitter using the principles of this invention, along with the principle of mixed-highs.

Figure 5 shows a television transmitter using the herein described segment of a line sequential color system, along with the principle of mixed-highs. In this system, the high frequency video signal is transmitted in black and white and color information is transmitted only for the lower video frequencies.

In Figure 5, synchronizing generator 10 provides line and field synchronizing signals to color camera 61. Color camera 61 may have three television pick-up tubes, each having projected upon its sensitive mosaic a picture in a different primary color. Only the cathodes 62, 63 and 64 of these three color tubes are shown in Figure 5. The output signals derived from the cathodes 62, 63 and 64 are passed respectively through high-pass filters 66, 67 and 68 which pass only signals between two and four megacycles. The filtered signals are combined and fed directly into transmitter 25.

The output signals from cathodes 62, 63 and 64 are also fed respectively to low-pass filters 72, 73 and 74. Low-pass filters 72, 73 and 74 pass only signals from 0 to 2 megacycles. The outputs of low-pass filters 72, 73 and 74 are fed respectively to gate circuits 76, 77 and 78. Gate circuits 76, 77 and 78 pass the video signals from low-pass filters 72, 73 and 74 only while these gate circuits are supplied with gating pulses.

Gate pulse generator 12 is supplied with line synchronizing signals by synchronizing generator 10. Gate pulse generator 12 then supplies 637,875 gating pulses per second to gating circuits 76, 77 and 78. These gating pulses are supplied directly to gating circuit 76. They are delayed by a period equal to one color interval by delay circuit 79 and are applied to gating circuit 77. The delayed signals provided at the output of delay circuit 79 are further delayed by a period equal to one color interval and are applied to gating circuits 78. The outputs of gating circuit 76, 77 and 78 are combined and are fed to transmitter 25 along with the black and white video signals between 2 and 4 megacycles. Transmitter 25 modulates the combined black and white and color video signals, along with color, line and field synchronizing signals as in Figure 1, on a radio frequency carrier and transmits this radio frequency carrier from antenna 26. In the interest of simplicity, the connections supplying the line and field synchronizing pulses to transmitter 25 are not shown in Figure 5.

In Figure 5, synchronizing generator 10, gate pulse generator 12 and modulation wave generator 13 have the same construction and function as already described in relation to the transmitter shown in Figure 1.

In the operation of the color transmitter shown in Figure 5, the three outputs of camera 61 continuously produce signals representative of the three primary colors in the picture being scanned. The high frequency video signal components are filtered out by high-pass filters 66, 67 and 68, are combined to produce a black and white video signal, and are fed directly to the transmitter 25.

The low frequency video signal components are separated by low-pass filters 72, 73 and 74 and are fed respectively to gate circuits 76, 77 and 78. When gate circuit 76 receives a gating pulse from generator 12, this pulse, having a duration equal to one color interval, allows the low frequency signal components from cathode 62 to pass to the transmitter 25. When this gating pulse comes to an end, the signal picked up by cathode 62 is cut off, and this pulse delayed by circuit 79 is then applied to gating circuit 77 which allows the signal from the cathode 63 to pass through to the transmitter 25. When this gating pulse from delay circuit 79 comes to an end, the signal from cathode 63 is shut off, but this pulse delayed by circuit 80 is now applied to gate 78 which permits the low frequency component of the signal picked up at cathode 64 to be passed through to transmitter 25.

The low frequency video color signals, each segment-of-a-line representing a different color of the color cycle, are combined with the high frequency black and white video signal components and are transmitted from transmitter 25 on a radio frequency carrier.

Figure 6:
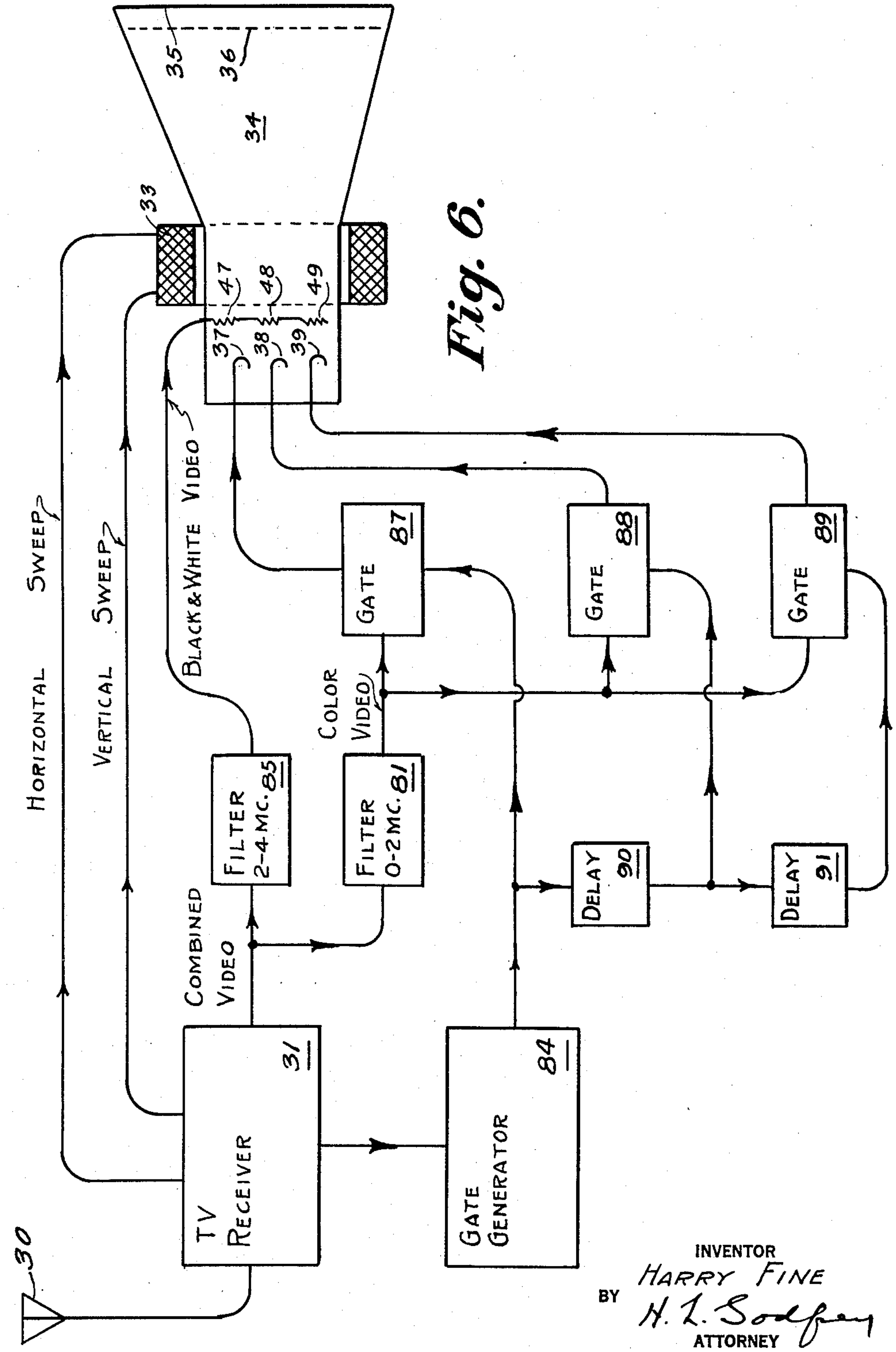
Figure 6 is a schematic diagram showing a television receiver for reproducing a picture from the signal produced by the transmitter of Figure 5.

Figure 6 shows a receiver arranged to produce a picture in color from the signals transmitted by the transmitter of Figure 5. In Figure 6, antenna 30 picks up the radio frequency signal transmitted from antenna 26 and feeds this signal to receiver 31.

Television receiver 31 separates the line and frame synchronizing signals and provides in accordance therewith horizontal and vertical sweep waves which it applies to the deflection yoke 33 of the cathode ray tube 34. Cathode ray tube 34 is the same in construction and operation as tube 34 in Figure 3.

The combined video signal comprising the high frequency black and white signals and the segment-of-a-line sequential low frequency color signal is also provided as an output in receiver 31. This combined video signal is passed through high-pass filter 85 which passes signal components between 2 and 4 megacycles. The black and white picture components passing through filter 85 are applied to control grids 47, 48 and 49 of the cathode ray tube 34.

The combined video signal is also fed to low-pass filter 81 which passes only signal components between 0 and 2 megacycles. The color components passed by filter 81 are fed to gating circuits 87, 88 and 89. The outputs of gate circuits 87, 88 and 89 are respectively connected to cathodes 37, 38 and 39 of cathode ray tube 34. The construction of gating circuits 87, 88 and 89 may be the same as that of gating circuits 76, 77 and 78 shown in Figure 5 and is such that these gating circuits will pass a video signal only while a gating pulse is supplied thereto.

In Figure 6, television receiver 31 supplies a color synchronizing signal to gate generator 84 which provides gating pulses, each equal in duration to a color interval and separated by a space equal to two color intervals. These gating pulses are supplied directly by generator 84 to gating circuit 87. The gating pulses from generator 84 are applied to delay circuit 90 where they are delayed by an amount equal to one color interval and are applied to gating circuit 88. The gating pulses provided at the output of delay circuit 90 are further delayed by delay circuit 91 by an amount equal to one color interval and are applied to gating circuit 89.

The operation of antenna 30, receiver 31, and deflection yoke 33 is the same as has already been described in connection with Figure 3.

The combined video signal produced by receiver 31 is fed to high-pass filter 85 which passes only the signal components between 2 and 4 megacycles. These signal components are the black and white high frequency video components for all colors and these signals are impressed directly upon the grids 47, 48 and 49 of the three color guns in cathode ray tube 34.

The combined video signal provided by receiver 31 is also applied to low-pass filter 86 which passes only signal components between 0 and 2 megacycles. These signal components are the low frequency segment-of-a-line sequential color signal and these signals are applied to all three gating circuits 87, 88 and 89.

The gate pulses synchronized by the color synchronizing pulses separated in receiver 31 are applied directly to gating circuit 87. These gating pulses are so synchronized that gating circuit 87 is opened to pass color signals while the appropriate color at the transmitter is being scanned. For instance, if cathode 37 is in such a position with respect to the holes of mask 36 that electrons from this cathode may impinge only on red phosphor dots, then gating circuit 87 is opened only while the low frequency signals representative of the red component of the segment-of-a-line being scanned are passed to the transmitter of Figure 5.

When the gating pulse ceases and gate 87 shuts off, this gating pulse, having been delayed in circuit 90, is now applied to gate 88 which passes the color signal to cathode 38. If cathode 38 provides electrons only for the green dots of screen 35, then gating circuit 88 is opened only while signals representative of the green intensity of the segment-of-a-line being scanned are passed to the transmitter 25 of Figure 8. When this gating pulse, applied to gating circuit 88, comes to an end, this circuit is shut off, but the gating pulse delayed by circuit 91 is applied to gating circuit 89 and permits the color signal to be applied to cathode 39 of the cathode ray tube 34. If cathode 39 provides electrons which may only impinge on blue phosphor dots of the screen 48, then gate 89 is opened only while signals representative of the blue intensity of the segment-of-a-line being scanned are passed to the transmitter 25 of Figure 5.

In this system, shown in Figures 5 and 8, the high frequency signals representative of the three primary colors are filtered out in Figure 5 and combined to produce a high frequency video signal representative of the black and white picture detail. This signal is applied to the cathode ray receiving tube to produce the fine definition of the picture in black and white. The picture is scanned continuously in three colors by three pick-up tubes. For one segment-of-a-line, the signals representative of the red picture content may be passed to the transmitter. For a second segment-of-a-line, the signals representative of the green content of the picture may be passed to the transmitter. For the third segment-of-a-line, the signals representative of the blue picture content may be passed to the transmitter. This segment-of-a-line sequential color cycle is repeated to the end of the line and to the remaining lines of the picture. However, only the low frequency color signals representative of the coarse picture detail are passed to the transmitter. At the receiver, the sequential color signals are applied to the receiving tube screen in proper sequence to provide the coarse picture detail. Since the eye does not readily perceive detail in color, an acceptable color picture is provided within a relatively small band of signal frequencies.

It will be apparent to those skilled in the art that the television system described above provides a color reproducing arrangement which is compatible with the present standards for producing monochrome pictures. The signal will pass through the existing 2.8 width megacycle cables. There will be a minimum of objectionable color crawl and the color switching rate is sufficiently low that it can be effected by ordinary flip-flop circuits. There will be a minimum of gray areas and a maximum of brilliant colors. It will permit higher definition through the use of dot interlace.

It will be understood that the color television system herein described is also adaptable for use with less than three primary colors and that primary colors other than those used in the above examples may be used.

The embodiments of the invention described above are exemplary only. Many changes and modifications will occur to those skilled in the art within the scope of the appended claims.

What is claimed is:

1. In a television system, a color camera, means including horizontal and vertical deflecting means to cause a scanning of the image viewed by the camera, color selecting means to select the color indicated by the camera output signal, a pulse generator producing color control pulses, said pulse generator being connected to said color selecting means so that the color selecting means are cyclically energized, the duration of each of said color control pulses being such that one color selecting means is energized continuously for a period that is substantially less than the horizontal scanning period but substantially greater than the period required to scan one element of the image.

2. The combination of claim 1 in which the horizontal and vertical deflection waves are arranged to cause interlaced scanning and in which a modulating wave generator is provided having a period twice that of the vertical scanning wave, said modulating wave being applied to modulate said color control pulses to effectively change their phase in one field with respect to their phase in another field.

3. The combination of claim 1 in which there are provided means for producing color synchronizing signals indicative of the frequency and phase of the color control pulses, and means for inserting said color synchronizing signals between video signals representative of contiguously scanned lines.

4. The combination of claim 1 with means for applying a signal representative of the camera output signal to each of different control means in a color picture reproducing device, and means for making said control means effective sequentially in synchronism with the operation of said color selecting means.

5. In combination, a television camera for producing a plurality of outputs each representing respectively one color of the picture being scanned, high-pass filter means connected to said outputs for passing the high frequency components of said signals, low-pass filter means connected to said output for passing the low frequency outputs of said signals, a gating circuit corresponding to each of said camera outputs connected to said low-pass filter means, said low frequency signals of each camera output being fed to the corresponding gating circuit, means for applying enabling gating pulses in sequence to said gating circuits, said gating pulses having a duration of less than line length but a duration greater than the length of the picture element, means for combining the outputs of said gating circuits and said high frequency filters.

6. The combination of claim 5 in which there are provided means for producing color synchronizing signals indicative of the frequency and phase of said gating pulses and means for inserting said color synchronizing signals between video signals representative of contiguously scanned lines.

7. The combination of claim 5 with means for receiving said combined signal, high-pass filter means connected to said receiver to pass only the high frequency signals, means for applying said high frequency signals to a plurality of control elements of a picture reproducing device, each control element being arranged to control the intensity of one color in the reproduced picture, low-pass filter means connected to said receiver to pass only low frequency received signals, a receiver gating circuit corresponding to each of said camera outputs, means to apply said low frequency received signals to each of said receiver gating circuits, means to produce receiver gating pulses, synchronizing means to cause said gating pulses to correspond in duration and time sequence to said first mentioned gating pulses, means for applying said receiver gating pulses to said receiver gating circuits to cause said gating circuits to become operative, means for applying the outputs of each of said receiver gating circuits to a different control electrode of said picture reproducing device.

8. In a television system, a color camera, means including horizontal and vertical deflecting means operative to scan an image viewed by the camera, said color camera containing separate circuits for each of the three primary colors, a pulse generator cyclically producing color control gate pulses, said pulse generator being connected to supply sequentially energizing pulses to render the various color circuits of the camera operative during the time the gate pulses are applied, said pulse generator being connected to supply the gate pulse to one color circuit of the color camera and then to produce no pulse for a period equal to twice the gate pulse, a delay circuit operating in dependency on said pulse generator to supply a second pulse equal in duration to the gate pulse to a second color circuit in the color camera upon termination of the first pulse supplied to the camera, a second delay circuit operating in dependency on said pulse generator, said second delay circuit supplying a third energizing pulse equal in duration to the gate pulse to a third color circuit of the camera at the end of the delayed pulse, the duration of each of said color control pulses being such that one color circuit is energized continuously for a period that is substantially less than the horizontal scanning period but substantially greater than the period required to scan one element of the image.

9. In a television system a color camera with three primary color circuits, means including a horizontal and vertical deflecting means operative to scan an image viewed by the camera, a gate pulse generator cyclically supplying an energizing pulse and feeding it directly to one color circuit, a first delay circuit receiving said energizing pulse and feeding it to a second color circuit at the termination of said energizing pulse, a second delay circuit receiving said energizing pulse and at the termination of the first delayed color energizing pulse feeding it to the third color circuit, the duration of each of said color control pulses fed to the color control circuits being such that one color circuit is energized continuously for a period that is substantially less than the horizontal scanning period but substantially greater than the period required to scan one element of the image.

References Cited in the file of this patent

UNITED STATES PATENTS 2,686,831 Dome ------------------ Aug. 17, 1954

FOREIGN PATENTS 432,989 Great Britain ------------ Aug. 7, 1935

OTHER REFERENCES

Synchronization for Color Dot Interlace in the RCA Color Television System; RCA; October 1949, page 5.

UNITED STATES PATENT OFFICE

CERTIFICATE OF CORRECTION

Patent No. 2,903,505 September 8, 1959

Harry Fine

It is hereby certified that error appears in the printed specification of the above numbered patent requiring correction and that the said Letters Patent should read as corrected below.

Column 1, between lines 12 and 15, insert the following paragraph:

-- This application is a division of my earlier application Serial No. 242,973 filed on August 21, 1951, for Color Television Systems, and now abandoned. --.

Signed and sealed this 13th day of September 1960.

(SEAL)
Attest:

KARL H. AXLINE
Attesting Officer

ROBERT C. WATSON
Commissioner of Patents